United States Patent
Yoshida et al.

(10) Patent No.: US 9,359,953 B2
(45) Date of Patent: Jun. 7, 2016

(54) COMBINED CYCLE POWER PLANT WITH SOLAR ASSISTED COOLING OF COMPRESSOR INLET AIR

(75) Inventors: Yasuhiro Yoshida, Hitachi (JP); Yukinori Katagiri, Hitachi (JP); Tatsurou Yashiki, Hitachiota (JP); Takuya Yoshida, Mito (JP); Kazuo Takahashi, Hitachi (JP); Naohiro Kusumi, Hitachinaka (JP); Takaaki Sekiai, Hitachinaka (JP)

(73) Assignee: Mitsubishi Hitachi Power Systems, Ltd., Yokohama (JP)

( * ) Notice: Subject to any disclaimer, the term of this patent is extended or adjusted under 35 U.S.C. 154(b) by 560 days.

(21) Appl. No.: 13/818,377

(22) PCT Filed: Sep. 30, 2010

(86) PCT No.: PCT/JP2010/067097
§ 371 (c)(1),
(2), (4) Date: Apr. 6, 2013

(87) PCT Pub. No.: WO2012/042639
PCT Pub. Date: Apr. 5, 2012

(65) Prior Publication Data
US 2013/0192193 A1 Aug. 1, 2013

(51) Int. Cl.
*F02C 3/30* (2006.01)
*F02C 7/143* (2006.01)
(Continued)

(52) U.S. Cl.
CPC ............. *F02C 7/1435* (2013.01); *F01K 23/10* (2013.01); *F01K 23/101* (2013.01); *F02C 1/05* (2013.01);
(Continued)

(58) Field of Classification Search
CPC ............ F02C 3/30; F02C 3/305; F02C 7/143; F02C 7/1435; F24F 5/0046; F24F 6/18; F25B 27/002; F01K 23/01
See application file for complete search history.

(56) References Cited

U.S. PATENT DOCUMENTS 4,307,711 A * 12/1981 Doundoulakis ............ F24J 2/06
126/600
4,529,887 A * 7/1985 Johnson .................... F02C 6/18
290/40 A
(Continued)

FOREIGN PATENT DOCUMENTS

| JP | 4-101024 A | 4/1992 |
| JP | 2000-345857 A | 12/2000 |

(Continued)

OTHER PUBLICATIONS

International Preliminary Report on Patentability (PCT/IB/338 & PCT/IB/373), including Written Opinion (PCT/ISA/237) dated Apr. 18, 2013 (seven (7) pages.
(Continued)

*Primary Examiner* — Lorne Meade
(74) *Attorney, Agent, or Firm* — Crowell & Moring LLP (57) ABSTRACT

Disclosed is a solar assisted combined cycle power plant having a compressor that pressurizes combustion air, a combustor that mixes and burns the combustion air and gas turbine fuel to generate a high-temperature combustion gas, a gas turbine that drives the compressor by using the combustion gas, an exhaust heat recovery steam generator that obtains steam from thermal energy of a gas exhausted from the gas turbine, and a steam turbine that is driven by using the steam obtained by the exhaust heat recovery steam generator. The solar assisted combined cycle power plant includes a solar collector to turn supplied water to warm water; a heat accumulator that stores pressurized hot water from the solar collector and the exhaust heat recovery steam generator; and a spray device that handles the pressurized hot water as spray water and sprays the spray water onto the air to be taken into the compressor.

5 Claims, 3 Drawing Sheets

(51) Int. Cl.
  *F01K 23/10* (2006.01)
  *F02C 1/05* (2006.01)
  *F02C 6/18* (2006.01)
  *F22B 1/00* (2006.01)
  *F22B 1/18* (2006.01)
  *F03G 6/06* (2006.01)
  *F03G 6/00* (2006.01)
  *F24J 2/04* (2006.01)

(52) U.S. Cl.
  CPC . *F02C 3/30* (2013.01); *F02C 3/305* (2013.01); *F02C 6/18* (2013.01); *F02C 7/143* (2013.01); *F03G 6/003* (2013.01); *F03G 6/064* (2013.01); *F22B 1/006* (2013.01); *F22B 1/1815* (2013.01); *F24J 2/04* (2013.01); *Y02E 10/46* (2013.01); *Y02E 20/16* (2013.01)

(56) References Cited

U.S. PATENT DOCUMENTS

| | | | |
|---|---|---|---|
| 6,000,211 A * | 12/1999 | Bellac | F01K 21/047 60/39.182 |
| 6,216,443 B1 * | 4/2001 | Utamura | F01K 21/047 181/214 |
| 6,256,976 B1 * | 7/2001 | Kataoka | F02C 3/305 60/39.52 |
| 6,389,799 B1 * | 5/2002 | Hatamiya | F02C 3/30 60/39.3 |
| 6,453,659 B1 * | 9/2002 | Van Liere | B05B 9/005 123/541 |
| 6,560,957 B2 | 5/2003 | Hatamiya et al. | |
| 6,637,185 B2 | 10/2003 | Hatamiya et al. | |
| 6,854,259 B2 | 2/2005 | Hatamiya et al. | |
| 6,973,772 B2 | 12/2005 | Hatamiya et al. | |
| 7,146,794 B2 | 12/2006 | Hatamiya et al. | |
| 7,278,255 B2 | 10/2007 | Hatamiya et al. | |
| 8,601,821 B2 * | 12/2013 | Ball, Jr. | F01K 21/047 60/39.182 |
| 8,978,386 B2 * | 3/2015 | Sekiai | F02C 6/18 60/39.3 |
| 2006/0174622 A1 * | 8/2006 | Skowronski | F01K 23/10 60/641.8 |
| 2008/0127647 A1 * | 6/2008 | Leitner | F02C 1/007 60/645 |
| 2009/0038313 A1 * | 2/2009 | Ball, Jr. | F01K 21/047 60/775 |
| 2010/0154781 A1 | 6/2010 | Zhang et al. | |

FOREIGN PATENT DOCUMENTS

| | | |
|---|---|---|
| JP | 2001-214757 A | 8/2001 |
| JP | 2009-19526 A | 1/2009 |
| JP | 2009-174542 A | 8/2009 |
| JP | 2010-144725 A | 7/2010 |
| WO | WO 98/48159 A1 | 10/1998 |
| WO | WO 2012/042628 A1 | 4/2012 |
| WO | WO 2012/042641 A1 | 4/2012 |
| WO | WO 2012/042652 A1 | 4/2012 |
| WO | WO 2012/042655 A1 | 4/2012 |

OTHER PUBLICATIONS

Corresponding International Search Report with English Translation dated Nov. 22, 2010 (five (5) pages).

Japanese-language Written Opinion dated Nov. 22, 2010 (PCT/ISA/237) (four (4) pages).

* cited by examiner

COMBINED CYCLE POWER PLANT WITH SOLAR ASSISTED COOLING OF COMPRESSOR INLET AIR

TECHNICAL FIELD

The present invention relates to a solar assisted combined cycle power plant having a solar collector that acquires thermal energy from sunlight.

BACKGROUND ART

A gas turbine power plant and a combined cycle power plant are used as a power plant that provides industrial electrical power. It is known that when the gas turbine power plant or the combined cycle power plant is operated in summer or at a high ambient temperature, the air intake quantity of a compressor is smaller than when the plant is operated at a low ambient temperature. Such a relative decrease in the intake air quantity of the compressor results in a decrease in power output and in thermal efficiency.

A regenerative cycle gas turbine power plant disclosed, for instance, in Patent Document 1 increases both the power output and thermal efficiency of the gas turbine power plant. This regenerative cycle gas turbine power plant cools intake air by spraying the upstream of a compressor with fine water drops and increases the power output by raising the temperature of humidified air by using the exhaust gas of a gas turbine as a heat source.

PRIOR ART LITERATURE

Patent Document

Patent Document 1: International Publication No. WO98/48159

SUMMARY OF THE INVENTION

Problem to be Solved by the Invention

Even when operated at a high ambient temperature, the above-mentioned gas turbine power plant can efficiently operate while maintaining an adequate generator output. However, the above-mentioned gas turbine power plant heats combustion air by using the exhaust gas derived from the gas turbine. Therefore, when the configuration of the gas turbine power plant described in Patent Document 1 is applied to a combined cycle power plant, a low-temperature exhaust gas, which is obtained after heating the combustion air, is introduced into an exhaust heat recovery steam generator. This decreases the overall thermal efficiency of the power plant.

The present invention has been made in view of the above circumstances. An object of the present invention is to provide a solar assisted combined cycle power plant that can suppress a decrease in thermal efficiency of combined cycle power generation by using solar thermal energy and maintain a steady power output without regard to meteorological conditions.

Means for Solving the Problem

In accomplishing the above-described object, according to a first aspect of the present invention, there is provided a solar assisted combined cycle power plant having a compressor that pressurizes combustion air, a combustor that mixes and burns the combustion air and gas turbine fuel to generate a high-temperature combustion gas, a gas turbine that drives the compressor by using the combustion gas, an exhaust heat recovery steam generator that obtains steam from thermal energy of a gas exhausted from the gas turbine, and a steam turbine that is driven by using the steam obtained by the exhaust heat recovery steam generator. The solar assisted combined cycle power plant includes a solar collector, a heat accumulator, and a spray device. The solar collector uses the thermal energy of sunlight to turn supplied water to warm water. The heat accumulator stores pressurized hot water derived from solar collector and the exhaust heat recovery steam generator. The spray device handles the pressurized hot water, which is stored in the heat accumulator, as spray water and sprays the spray water onto the air to be taken into the compressor.

In accomplishing the above-described object, according to a second aspect of the present invention, there is provided a solar assisted combined cycle power plant having a compressor that pressurizes combustion air, a combustor that mixes and burns the combustion air and gas turbine fuel to generate a high-temperature combustion gas, a gas turbine that drives the compressor by using the combustion gas, an exhaust heat recovery steam generator that obtains steam from thermal energy of a gas exhausted from the gas turbine, and a steam turbine that is driven by using the steam obtained by the exhaust heat recovery steam generator. The solar assisted combined cycle power plant includes a water supply tank, a first water supply pump, a solar collector, a heat accumulator, and a spray device. The water supply tank stores water to be supplied. The first water supply pump operates so that the water in the water supply tank is pressurized and conveyed. The solar collector uses thermal energy of sunlight to heat the water supplied from the first water supply pump. The heat accumulator stores pressurized hot water derived from the solar collector and the exhaust heat recovery steam generator. The spray device sprays the pressurized hot water, which is stored in the heat accumulator, onto the air to be taken into the compressor.

In accomplishing the above-described object, according to a third aspect of the present invention, there is provided a solar assisted combined cycle power plant having a compressor that pressurizes combustion air, a combustor that mixes and burns the combustion air and gas turbine fuel to generate a high-temperature combustion gas, a gas turbine that drives the compressor by using the combustion gas, an exhaust heat recovery steam generator that obtains steam from thermal energy of a gas exhausted from the gas turbine, and a steam turbine that is driven by using the steam obtained by the exhaust heat recovery steam generator. The solar assisted combined cycle power plant includes a water supply tank, a first water supply pump, a solar collector, a heat exchanger, a heat accumulator, and a spray device. The water supply tank stores water to be supplied. The first water supply pump operates so that the water in the water supply tank is pressurized and conveyed. The solar collector uses thermal energy of sunlight to heat the water supplied from the first water supply pump. The heat exchanger heats pressurized hot water from the solar collector by using a fluid derived from the exhaust heat recovery steam generator. The heat accumulator stores the pressurized hot water derived from the heat exchanger. The spray device sprays the pressurized hot water, which is stored in the heat accumulator, onto the air to be taken into the compressor.

According to a fourth aspect of the present invention, there is provided the solar assisted combined cycle power plant as described in any one of the first to third aspects, further including a temperature sensor disposed in the heat accumulator to measure the temperature of the pressurized hot water in the heat accumulator, a pressure sensor disposed in the heat accumulator to measure the pressure of the pressurized hot water, a flow sensor disposed on the inlet side of the spray device to measure the flow rate of the spray water, a temperature sensor disposed on the inlet side of the heat accumulator to measure the temperature of the pressurized hot water, a water flow regulating valve for controlling the flow rate of supplied water at the outlet of the first water supply pump, a pressure controller for acquiring a value measured by the pressure sensor and controlling the water flow regulating valve, a spray water flow regulating valve for controlling the flow rate of the spray water at the inlet of the spray device, a flow controller for acquiring a flow rate value measured by the flow sensor and controlling the spray water flow regulating valve, a temperature regulating valve for controlling the flow rate of the pressurized hot water from the exhaust heat recovery steam generator or the flow rate of the fluid from the exhaust heat recovery steam generator, and a warm water temperature controller for acquiring values measured by the temperature sensors and controlling the temperature regulating valve.

According to a fifth aspect of the present invention, there is provided the solar assisted combined cycle power plant as described in the fourth aspect, further including a water supply piping for acquiring part of water in the water supply tank, a second water supply pump for pressurizing and conveying the water in the water supply piping, and a junction piping for directing the water conveyed from the second water supply pump to the downstream of the heat accumulator.

According to a sixth aspect of the present invention, there is provided the solar assisted combined cycle power plant as described in the fifth aspect, further including a temperature sensor disposed on the inlet side of the spray device to measure the temperature of the spray water, a spray water temperature regulating valve for controlling the flow rate of supplied water at the outlet of the second water supply pump, and a spray water temperature controller for acquiring a value measured by the temperature sensor and controlling the spray water temperature regulating valve.

Effects of the Invention

The present invention provides a solar assisted combined cycle power plant that turns water drops to be sprayed onto the upstream of a compressor to pressurized warm water by using a solar collector for acquiring thermal energy from sunlight, stores the pressurized warm water in a heat accumulator to obtain pressurized hot water, and sprays the pressurized hot water onto intake air at the inlet of the compressor to achieve flash boiling. Therefore, the solar assisted combined cycle power plant provided by the present invention is capable of suppressing a decrease in thermal efficiency of combined cycle power generation and maintaining a steady power output without regard to meteorological conditions.

MODE FOR CARRYING OUT THE INVENTION

First Embodiment

Figure 1:
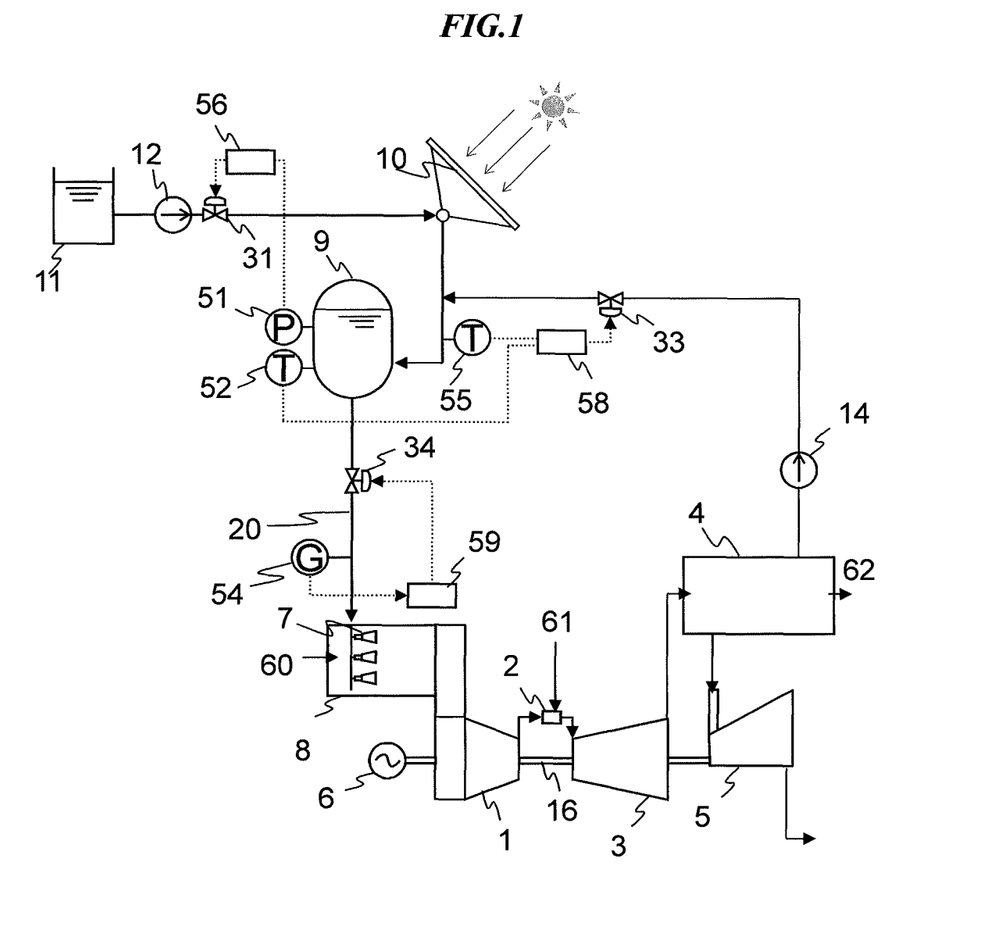
FIG. 1 is a system configuration diagram illustrating a first embodiment of a solar assisted combined cycle power plant according to the present invention.

A first embodiment of a solar assisted combined cycle power plant according to the present invention will now be described with reference to an accompanying drawing. FIG. 1 is a system configuration diagram illustrating the first embodiment of the solar assisted combined cycle power plant according to the present invention.

FIG. 1 shows a system flow of a combined cycle power plant that includes a solar collector, a heat accumulator, a spray device, a gas turbine, an exhaust heat recovery steam generator, and a steam turbine.

Referring to FIG. 1, the combined cycle power plant includes a compressor 1, a combustor 2, a gas turbine 3, an exhaust heat recovery steam generator 4, a steam turbine 5, and a generator 6. The compressor 1 takes in air from an intake duct 8, pressurizes the air, and supplies the air to the combustor 2 as combustion air 60. The combustor 2 mixes a gas turbine fuel 61 with the combustion air 60 and burns the mixture to generate a high-temperature combustion gas. The combustion gas drives the gas turbine 3. An exhaust gas generated after the gas turbine 3 is driven is supplied to the exhaust heat recovery steam generator 4 so that supplied water (not shown) is heated to generate steam. The steam drives the steam turbine 5. An exhaust gas 62 shown in FIG. 1 is the exhaust gas obtained after heat recovery is achieved by the exhaust heat recovery steam generator 4. The gas turbine 3 and the steam turbine 5 drive the compressor 1 and the generator 6 through a drive shaft 16 to generate electrical power.

The solar assisted combined cycle power plant according to the present invention differs from the above-described combined cycle power plant in that the former includes a solar warm water spray apparatus.

The solar warm water spray apparatus substantially includes a spray device 7, a heat accumulator 9, a solar collector 10, a water supply tank 11, a first water supply tank 12, a water conveying pump 14, a flow regulating valve 31, a temperature regulating valve 33, and a spray water flow regulating valve 34.

The intake duct 8 disposed on the intake side of the compressor 1 includes thereinside the spray device 7. The spray device 7 sprays pressurized hot water, which is stored in the heat accumulator 9, toward the compressor 1.

Water drops sprayed into the intake duct 8 by the spray device 7 are increasingly miniaturized by flash boiling. The miniaturized water drops are then immediately evaporated in the intake duct 8 and at the inlet of the compressor 1 so that the latent heat of vaporization lowers the ambient temperature. As this increases the density and mass flow rate of intake air, the output of the generator increases. This results in an increase in the power generation efficiency of the solar assisted combined cycle power plant.

In the first embodiment of the solar assisted combined cycle power plant according to the present invention, the pressurized hot water to be sprayed from the spray device 7 is supplied from the heat accumulator 9 through a spray water piping 20 in which the spray water flow regulating valve 34 is disposed.

Pressurized warm water from the solar collector 10, which heats supplied cold water by using infrared rays included in sunlight, and heated warm water supplied from the exhaust heat recovery steam generator 4 through the water conveying pump 14 are mixed and supplied to the heat accumulator 9 and stored at high temperature and under high pressure. The pressure within the heat accumulator 9 is retained by raising a liquid level to compress air, nitrogen gas, or other enclosed non-condensable gas. For example, a flat plate solar collector, a vacuum tube solar collector, and a concentrating solar collector are proposed as the solar collector. Any type of solar collector may be used in the present embodiment.

A first water supply pump 12 pumps cold water to the solar collector 10 from the water supply tank 11 through the flow regulating valve 31. The first water supply pump 12 gives water pressure for supplying the heated warm water from the solar collector 10 to the heat accumulator 9.

The outlet of the solar collector 10 is connected to the inlet of the heat accumulator 9 through a warm water piping. The warm water piping is provided with a junction, which is substantially positioned at the center of the warm water piping. The junction is connected to a warm water supply piping that supplies part of heated warm water derived from the exhaust heat recovery steam generator 4 to the heat accumulator 9.

The warm water piping is provided with the water conveying pump 14 and the temperature regulating valve 33.

Further, the first embodiment of the solar assisted combined cycle power plant according to the present invention includes heat accumulator pressure controller 56, warm water temperature controller 58, and spray water flow controller 59 as controller for measuring the pressure of the heat accumulator 9, the temperature of the warm water, and the flow rate of the spray water and safely and efficiently operating the plant. The temperature of the warm water is detected by a temperature sensor 55 disposed downstream of the junction of the warm water piping and by a temperature sensor 52 provided for the heat accumulator 9. The pressure of the warm water in the heat accumulator 9 is detected by a pressure sensor 51 provided for the heat accumulator 9. The flow rate of the spray water is detected by a flow sensor 54 disposed downstream of the spray water piping 20.

The heat accumulator pressure controller 56 measures the pressure of the warm water in the heat accumulator 9 by using the pressure sensor 51 and controls the opening of the flow regulating valve 31 at the outlet of the first water supply pump 12 in such a manner that the value measured by the pressure sensor 51 agrees with a preselected pressure. This control process is performed to control the water flow rate at the outlet of the first water supply pump 12 for the purpose of regulating the flow rate of warm water flowing to the heat accumulator 9 and maintaining the warm water in the heat accumulator 9 at the preselected pressure.

The spray water flow controller 59 measures the flow rate of spray water flowing to the spray device 7 by using the flow sensor 54 and controls the spray water flow regulating valve 34 in such a manner that the value measured by the flow sensor 54 agrees with a preselected flow rate. This control process is performed for the purpose of directly reducing the driving force for the compressor 1.

The warm water temperature controller 58 measures the temperature of warm water at the inlet of the heat accumulator 9 and the temperature of warm water in the heat accumulator 9 by using the temperature sensors 55, 52 and controls the opening of the temperature regulating valve 33 disposed in the warm water supply piping in such a manner that the values measured by the temperature sensors 55, 52 both agree with a preselected temperature. This control process is performed to regulate the flow rate of the warm water to be supplied from the exhaust heat recovery steam generator 4 to the heat accumulator 9 for the purpose of maintaining the warm water in the heat accumulator 9 at the preselected temperature.

In the present embodiment, the heat accumulator 9 for storing pressurized hot water includes a system that mixes part of warm water of the exhaust heat recovery steam generator 4 with the pressurized hot water. Therefore, the heat accumulator 9 can supply the pressurized hot water to the spray device 7 as spray water without regard to meteorological conditions. As a result, the intake air for the compressor 1 can be steadily cooled. In the present invention, the meteorological conditions mean weather conditions and diurnal and seasonal changes of sunshine.

If, for instance, solar radiation conditions are degraded so that the supplied water cannot be sufficiently heated by the solar collector 10, the temperature regulating valve 33 can be opened to mix the warm water from the exhaust heat recovery steam generator 4 with the supplied water, thereby raising the temperature of warm water in the heat accumulator 9 above a target temperature.

If, on the contrary, the solar radiation conditions are excellent so that the temperature of warm water in the heat accumulator 9 can be raised above the target temperature by the solar collector 10 alone, the opening of the temperature regulating valve 33 can be reduced to decrease the amount of warm water to be derived from the exhaust heat recovery steam generator 4. This makes it possible to suppress a decrease in the overall power generation efficiency of a combined cycle.

The first embodiment of the solar assisted combined cycle power plant according to the present invention, which has been described above, turns supplied water, which is to be sprayed onto the upstream of the compressor 1 in the form of water drops, to pressurized warm water by using the solar collector 10, which acquires thermal energy from sunlight, stores the pressurized warm water in the heat accumulator 9 to obtain pressurized hot water, and sprays the pressurized hot water onto intake air at the inlet of the compressor 1 to achieve flash boiling. This makes it possible to provide a solar assisted combined cycle power plant that is capable of suppressing a decrease in thermal efficiency of combined cycle power generation and maintaining a steady power output without regard to the meteorological conditions.

Further, the first embodiment of the solar assisted combined cycle power plant according to the present invention, which has been described above, generates the pressurized hot water with the solar collector 10, stores the pressurized hot water in the heat accumulator 9, and sprays the pressurized hot water onto the intake air at the inlet of the compressor 1. Therefore, the latent heat of vaporization due to flash boiling achieved upon spraying lowers the temperature of the intake air for the compressor 1 and increases the density of the intake air. As this increases the mass flow rate of the intake air, the power output can be increased without increasing the amount of fuel.

Furthermore, the first embodiment of the solar assisted combined cycle power plant according to the present invention, which has been described above, uses the heat accumulator 9 to additionally generate the pressurized hot water even when the solar collector 10 generates a decreased amount of pressurized hot water. This makes it possible to steadily increase the output of combined cycle power generation without regard to the meteorological conditions.

Moreover, the first embodiment of the solar assisted combined cycle power plant according to the present invention, which has been described above, is a combined cycle power plant that is configured by combining the gas turbine 3, the steam turbine 5, and the exhaust heat recovery steam generator 4. Therefore, the first embodiment not only provides higher thermal efficiency than a power generation method based only on a gas turbine, but also reduces an increased amount of $CO_2$ emission. This will contribute toward the prevention of global warming.

Second Embodiment

Figure 2:
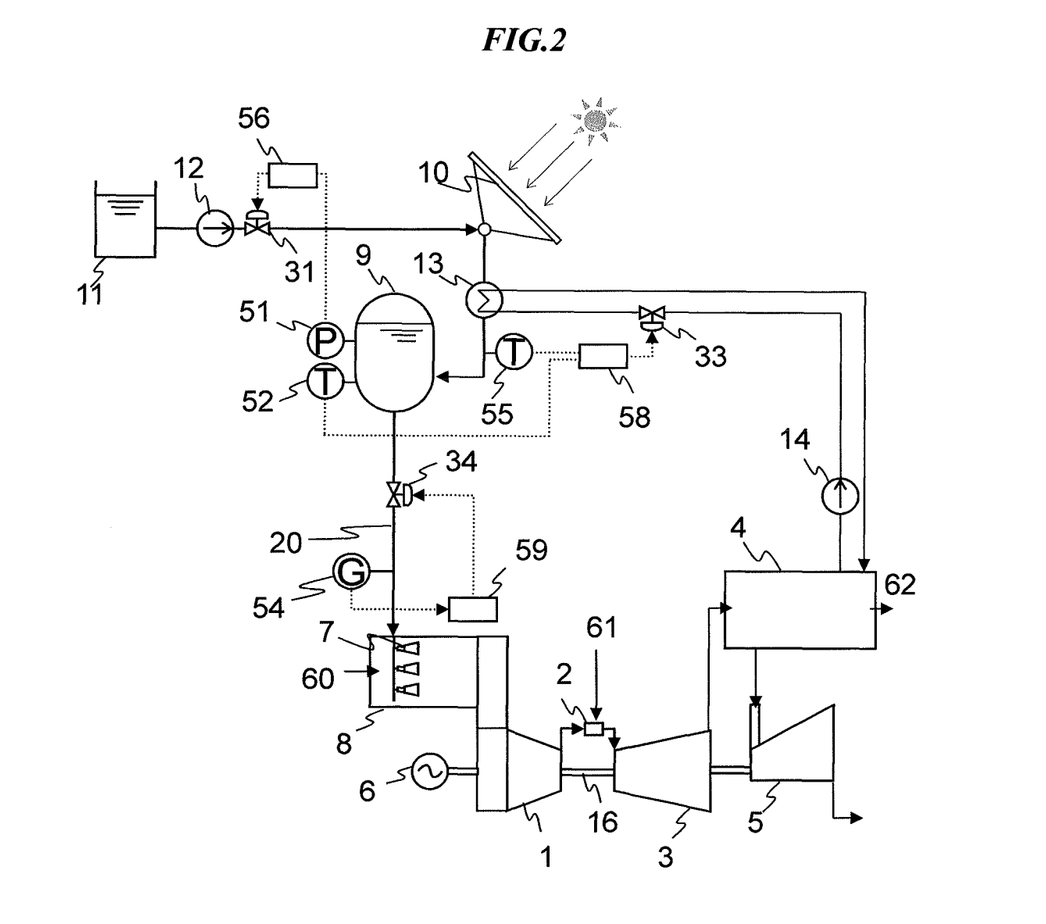
FIG. 2 is a system configuration diagram illustrating a second embodiment of the solar assisted combined cycle power plant according to the present invention.

A second embodiment of the solar assisted combined cycle power plant according to the present invention will now be described with reference to an accompanying drawing. FIG. 2 is a system configuration diagram illustrating the second embodiment of the solar assisted combined cycle power plant according to the present invention. Like elements in FIGS. 1 and 2 are designated by the same reference numerals and will not be redundantly described in detail.

FIG. 2 shows a system flow of a combined cycle power plant that includes a solar collector, a heat accumulator, a spray device, a gas turbine, an exhaust heat recovery steam generator, and a steam turbine. The second embodiment of the solar assisted combined cycle power plant according to the present invention is a combined cycle power plant having substantially the same configuration as the first embodiment. The difference in configuration between the first and second embodiments is described below.

The first embodiment of the solar assisted combined cycle power plant according to the present invention compensates for heating insufficiency due to changes in solar heat by mixing part of warm water in the exhaust heat recovery steam generator 2 with heated warm water derived from the solar collector 10 and storing the resulting mixture in the heat accumulator 9. On the other hand, the second embodiment has a heat exchanger 13 at the outlet of the solar collector 10 and compensates for heating insufficiency due to changes in solar heat by causing heat exchange between the heated warm water derived from the solar collector 10 and the fluid derived from the exhaust heat recovery steam generator 2 and storing the resulting water in the heat accumulator 9.

The heat exchanger 13 includes, for example, a heat transfer section, a main body section, a fluid inlet, and a fluid outlet. The heat transfer section has a coiled heat transfer pipe through which the fluid from the exhaust heat recovery steam generator 4 passes. The main body section is configured so that the heated warm water from the solar collector 10 passes the outside of the heat transfer section. The fluid inlet introduces the fluid into the heat transfer section. The fluid outlet discharges the fluid from the heat transfer section.

The exhaust heat recovery steam generator 4 supplies the fluid to the fluid inlet of the heat exchanger 13 through a fluid supply piping. The fluid discharged from the heat exchanger 13 returns from the fluid outlet to the exhaust heat recovery steam generator 4 through a fluid backflow piping. The fluid supply piping is provided with the water conveying pump 14 and the temperature regulating valve 33. The fluid derived from the exhaust heat recovery steam generator 2 may be warm water, steam, or exhaust gas.

The warm water temperature controller 58 according to the present embodiment measures the temperature of warm water at the inlet of the heat accumulator 9 and the temperature of warm water in the heat accumulator 9 with the temperature sensors 55, 52, and controls the opening of the temperature regulating valve 33 disposed in the fluid supply piping in such a manner that the values measured by the temperature sensors 55, 52 both agree with a preselected temperature. This control process is performed to regulate the flow rate of the fluid to be supplied from the exhaust heat recovery steam generator 4 to the heat exchanger 13 for the purpose of maintaining the warm water in the heat accumulator 9 at the preselected temperature.

When the solar radiation conditions are excellent, a large amount of pressurized hot water is generated from the solar collector 10 and supplied to the heat accumulator 9. In this instance, the flow regulating valve 31 needs to be adjusted to decrease the amount of water to be supplied for the purpose of suppressing an increase in the pressure of the heat accumulator 9. However, if the amount of water to be supplied is decreased, it is anticipated that a further temperature rise may occur in the solar collector 10 to let the temperature of the heated warm water derived from the solar collector 10 rise above the temperature of the fluid derived from the exhaust heat recovery steam generator 4. In this instance, the present embodiment opens the temperature regulating valve 33 to supply the fluid from the exhaust heat recovery steam generator 4 to the heat exchanger 13. An extra portion of the energy of heated warm water derived from the solar collector 10 is then returned to the exhaust heat recovery steam generator 4. As a result, the heat accumulator 9 can be safely operated by suppressing an increase in the temperature of the heated warm water.

The second embodiment of the solar assisted combined cycle power plant according to the present invention, which has been described above, provides the same advantages as the first embodiment, which has been described earlier.

Further, when the solar radiation conditions are excellent, the second embodiment of the solar assisted combined cycle power plant according to the present invention can recover an extra portion of the thermal energy of the pressurized hot water derived from the solar collector 10 by using the heat exchanger 13 disposed at the outlet of the solar collector 10 and return the recovered heat to the exhaust heat recovery steam generator 4. Hence, an increase in the pressure and temperature of warm water in the heat accumulator 9 can be suppressed. This makes it possible not only to safely operate the heat accumulator 9 but also to increase the overall thermal efficiency of the combined cycle power plant.

Third Embodiment

Figure 3:
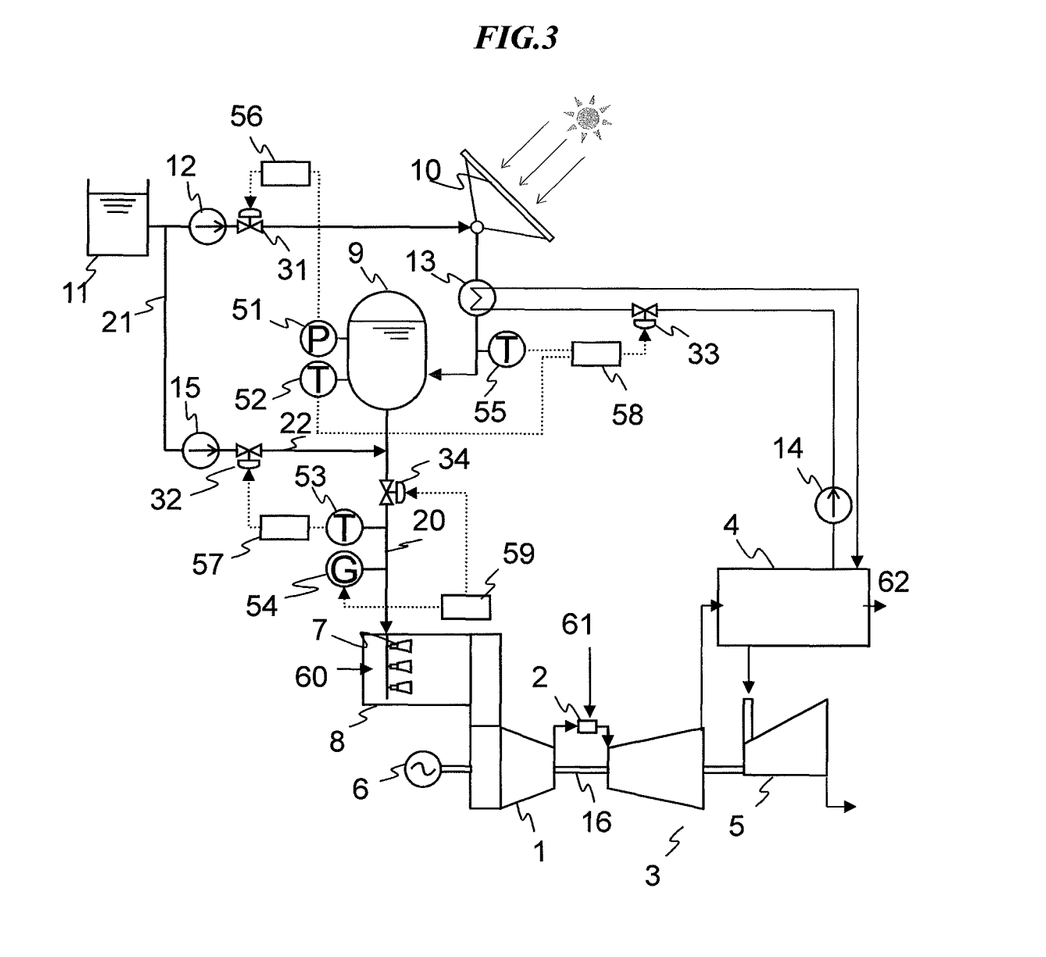
FIG. 3 is a system configuration diagram illustrating a third embodiment of the solar assisted combined cycle power plant according to the present invention.

A third embodiment of the solar assisted combined cycle power plant according to the present invention will now be described with reference to an accompanying drawing. FIG. 3 is a system configuration diagram illustrating the third embodiment of the solar assisted combined cycle power plant according to the present invention. Like elements in FIGS. 1 to 3 are designated by the same reference numerals and will not be redundantly described in detail.

FIG. 3 shows a system flow of a combined cycle power plant that includes a solar collector, a heat accumulator, a spray device, a gas turbine, an exhaust heat recovery steam generator, and a steam turbine. The third embodiment of the solar assisted combined cycle power plant according to the present invention is a combined cycle power plant having substantially the same configuration as the second embodiment. The difference in configuration between the second and third embodiments is described below.

The second embodiment of the solar assisted combined cycle power plant according to the present invention directly supplies pressurized hot water, as spray water, from the heat accumulator 9 to the spray device 4 through the spray water piping 20 in which the spray water flow regulating valve 34 is disposed. On the other hand, the third embodiment has a junction disposed upstream of the spray water flow regulating valve 34 in the spray water piping 20 and connects the junction to a junction piping 22 that enables the water supply tank 11 to supply water under the same pressure as in the heat accumulator 9.

At first, part of the water supplied from the water supply tank 11 is acquired by a water supply piping 21 and pressurized to the same pressure as in the heat accumulator 9 by a second water supply pump 15 disposed in the water supply piping 21. The outlet of the second water supply pump 15 is connected to one end of the junction piping 22 in which a spray water temperature regulating valve 32 is disposed. The other end of the junction piping 22 is connected to a junction of the spray water piping 20 disposed downstream of the heat accumulator 9. Therefore, the water supplied from the water supply tank 11, which is pressurized by the second water supply pump 15, mixes with the pressurized hot water from the heat accumulator 9 through the spray water temperature regulating valve 32.

The third embodiment of the solar assisted combined cycle power plant according to the present invention further includes spray water temperature controller 57 so that a temperature sensor 53 disposed downstream of the spray water piping 20 detects the temperature of spray water.

The spray water temperature controller 57 measures the temperature of the spray water to be supplied to the spray device 7 by using the temperature sensor 53 and controls the spray water temperature regulating valve 32 in such a manner that the value measured by the temperature sensor 53 agrees with a preselected spray water temperature. This control process is performed to regulate the flow rate of the water to be supplied from the water supply tank 11 to the spray device 7 for the purpose of maintaining the spray water at the preselected temperature.

It is preferred that the pressurized hot water to be supplied to the spray device 7 be at a pressure of 2 to 5 atmospheres and at a temperature of 120° C. to 150° C. However, when, for instance, the solar radiation conditions are excellent, it is anticipated that the pressure and temperature of the pressurized hot water stored in the heat accumulator 9 may be higher than the above preferred values. Meanwhile, it is known that the difference in the conditions of the pressurized hot water supplied to the spray device 7 does not affect an increase in the efficiency of the combined cycle power plant. Therefore, the supply of excessively pressurized, excessively hot water is contrary to the spirit of effective use and efficiency improvement of solar thermal energy.

In the present embodiment, the water supply tank 11 is used to mix cold water with the pressurized hot water to be supplied to the spray device 7 for the purpose of providing the spray device 7 with a constant supply of pressurized hot water. This makes it possible to decrease the consumption of the pressurized hot water supplied from the heat accumulator 9. As a result, the pressurized hot water can be stored in the heat accumulator 9 for a long period of time.

The third embodiment of the solar assisted combined cycle power plant according to the present invention, which has been described above, provides the same advantages as the first and second embodiments, which have been described earlier.

Further, the third embodiment of the solar assisted combined cycle power plant according to the present invention, which has been described above, part of supplied water is mixed with the pressurized hot water at the outlet of the heat accumulator 9 so that the spray water supplied to the spray device 7 is maintained at a fixed temperature. As this makes it possible to decrease the flow rate of the pressurized hot water supplied from the heat accumulator 9, the consumption of the pressurized hot water of the heat accumulator 9 can be suppressed. As a result, the pressurized hot water can be stored in the heat accumulator 9 for a long period of time. Consequently, the combined cycle power plant can steadily generate an increased output for a long period of time without regard to the meteorological conditions.

DESCRIPTION OF REFERENCE NUMERALS

1 . . . Compressor
2 . . . Combustor
3 . . . Gas turbine
4 . . . Exhaust heat recovery steam generator
5 . . . Steam turbine
6 . . . Generator
7 . . . Spray device
8 . . . Intake duct
9 . . . Heat accumulator
10 . . . Solar collector
11 . . . Water supply tank
12 . . . First water supply pump
13 . . . Heat exchanger
14 . . . Water conveying pump
15 . . . Second water supply pump
20 . . . Spray water piping
21 . . . Water supply piping
22 . . . Junction piping
31 . . . Flow regulating valve
32 . . . Spray water temperature regulating valve
33 . . . Temperature regulating valve
34 . . . Spray water flow regulating valve
51 . . . Pressure sensor
52 . . . Temperature sensor
53 . . . Temperature sensor
54 . . . Flow sensor
55 . . . Temperature sensor
56 . . . Heat accumulator pressure controller
57 . . . Spray water temperature controller
58 . . . Warm water temperature controller
59 . . . Spray water flow controller
60 . . . Combustion air
61 . . . Gas turbine fuel

The invention claimed is:

1. A combined cycle power plant with solar assisted cooling of compressor inlet air having a compressor that pressurizes the compressor inlet air into a combustion air, a combustor that mixes and burns the combustion air and a gas turbine fuel to generate a high-temperature combustion gas, a gas turbine that drives the compressor by using the combustion gas, an exhaust heat recovery steam generator that obtains steam from thermal energy of the combustion gas exhausted from the gas turbine, and a steam turbine that is driven by using the steam obtained by the exhaust heat recovery steam generator, the combined cycle power plant with solar assisted cooling comprising:

a solar collector that uses thermal energy of sunlight to turn supplied water to warm water;

a heat accumulator that stores pressurized hot water derived from the solar collector and the exhaust heat recovery steam generator;

a spray device that handles the pressurized hot water, which is stored in the heat accumulator, as spray water and sprays the spray water into the compressor inlet air to be taken into the compressor;

a temperature sensor disposed in the heat accumulator to measure temperature of the pressurized hot water in the heat accumulator;

a pressure sensor disposed in the heat accumulator to measure pressure of the pressurized hot water;

a flow sensor disposed on an inlet side of the spray device to measure flow rate of the spray water;

a temperature sensor disposed on an inlet side of the heat accumulator to measure temperature of the pressurized hot water;
a water flow regulating valve for controlling flow rate of supplied water at an outlet of a first water supply pump;
a pressure controller acquiring a value measured by the pressure sensor, the pressure controller controlling the water flow regulating valve;
a spray water flow regulating valve for controlling flow rate of the spray water at the inlet side of the spray device;
a flow controller acquiring a flow rate value measured by the flow sensor, the flow controller controlling the spray water flow regulating valve;
a temperature regulating valve for controlling flow rate of the pressurized hot water from the exhaust heat recovery steam generator; and
a warm water temperature controller acquiring values measured by the temperature sensor disposed in the heat accumulator and the temperature sensor disposed on inlet side of the heat accumulator, the warm water temperature controller controlling the temperature regulating valve.

2. The combined cycle power plant with solar assisted cooling of compressor inlet air according to claim 1, further comprising:
a water supply piping for acquiring part of water in a water supply tank; a second water supply pump for pressurizing and conveying the water in the water supply piping; and
a junction piping for directing the water conveyed from the second water supply pump to a spray water piping located downstream of the heat accumulator.

3. The combined cycle power plant with solar assisted cooling of compressor inlet air according to claim 2, further comprising:
a temperature sensor disposed on the inlet side of the spray device to measure temperature of the spray water;
a spray water temperature regulating valve for controlling flow rate of supplied water at an outlet of the second water supply pump; and
a spray water temperature controller acquiring a value measured by the temperature sensor on the inlet side of the spray device, the spray water temperature controller controlling the spray water temperature regulating valve.

4. A combined cycle power plant with solar assisted cooling of compressor inlet air having a compressor that pressurizes the compressor inlet air into a combustion air, a combustor that mixes and burns the combustion air and a gas turbine fuel to generate a high-temperature combustion gas, a gas turbine that drives the compressor by using the combustion gas, an exhaust heat recovery steam generator that obtains steam from thermal energy of the combustion gas exhausted from the gas turbine, and a steam turbine that is driven by using the steam obtained by the exhaust heat recovery steam generator, the combined cycle power plant with solar assisted cooling comprising:
a water supply tank that stores water to be supplied;
a first water supply pump that operates so that the water in the water supply tank is pressurized and conveyed;
a solar collector that uses thermal energy of sunlight to heat the water supplied from the first water supply pump;
a heat accumulator that stores pressurized hot water derived from the solar collector and the exhaust heat recovery steam generator;
a spray device that handles the pressurized hot water, which is stored in the heat accumulator, as spray water and sprays the spray water into the compressor inlet air to be taken into the compressor;
a temperature sensor disposed in the heat accumulator to measure temperature of the pressurized hot water in the heat accumulator;
a pressure sensor disposed in the heat accumulator to measure pressure of the pressurized hot water;
a flow sensor disposed on an inlet side of the spray device to measure flow rate of the spray water;
a temperature sensor disposed on an inlet side of the heat accumulator to measure temperature of the pressurized hot water;
a water flow regulating valve for controlling flow rate of supplied water at an outlet of the first water supply pump;
a pressure controller acquiring a value measured by the pressure sensor, the pressure controller controlling the water flow regulating valve;
a spray water flow regulating valve for controlling flow rate of the spray water at the inlet side of the spray device;
a flow controller acquiring a flow rate value measured by the flow sensor, the flow controller controlling the spray water flow regulating valve;
a temperature regulating valve for controlling flow rate of the pressurized hot water from the exhaust heat recovery steam generator; and
a warm water temperature controller acquiring values measured by the temperature sensor disposed in the heat accumulator and the temperature sensor disposed on inlet side of the heat accumulator, the warm water temperature controller controlling the temperature regulating valve.

5. A combined cycle power plant with solar assisted cooling of compressor inlet air having a compressor that pressurizes the compressor inlet air into a combustion air, a combustor that mixes and burns the combustion air and a gas turbine fuel to generate a high-temperature combustion gas, a gas turbine that drives the compressor by using the combustion gas, an exhaust heat recovery steam generator that obtains steam from thermal energy of the combustion gas exhausted from the gas turbine, and a steam turbine that is driven by using the steam obtained by the exhaust heat recovery steam generator, the combined cycle power plant with solar assisted cooling comprising:
a water supply tank that stores water to be supplied;
a first water supply pump that operates so that the water in the water supply tank is pressurized and conveyed;
a solar collector that uses thermal energy of sunlight to heat the water supplied from the first water supply pump;
a heat exchanger that heats pressurized hot water from the solar collector by using a fluid derived from the exhaust heat recovery steam generator;
a heat accumulator that stores pressurized hot water derived from the heat exchanger;
a spray device that handles the pressurized hot water, which is stored in the heat accumulator, as spray water and sprays the spray water into the compressor inlet air to be taken into the compressor;
a temperature sensor disposed in the heat accumulator to measure temperature of the pressurized hot water in the heat accumulator;
a pressure sensor disposed in the heat accumulator to measure pressure of the pressurized hot water;
a flow sensor disposed on an inlet side of the spray device to measure flow rate of the spray water;

a temperature sensor disposed on an inlet side of the heat accumulator to measure temperature of the pressurized hot water;

a water flow regulating valve for controlling flow rate of supplied water at an outlet of the first water supply pump;

a pressure controller acquiring a value measured by the pressure sensor, the pressure controller controlling the water flow regulating valve;

a spray water flow regulating valve for controlling flow rate of the spray water at the inlet side of the spray device;

a flow controller acquiring a flow rate value measured by the flow sensor, the flow controller controlling the spray water flow regulating valve;

a temperature regulating valve for controlling flow rate of the fluid from the exhaust heat recovery steam generator; and a warm water temperature controller acquiring values measured by the temperature sensor disposed in the heat accumulator and the temperature sensor disposed on inlet side of the heat accumulator, the warm water temperature controller controlling the temperature regulating valve.

* * * * *